United States Patent
Kono

[19]

[11] Patent Number: 5,914,707
[45] Date of Patent: *Jun. 22, 1999

[54] COMPACT PORTABLE AUDIO/DISPLAY ELECTRONIC APPARATUS WITH INTERACTIVE INQUIRABLE AND INQUISITORIAL INTERFACING

[75] Inventor: Mitsuru Kono, Suwa, Japan

[73] Assignee: Seiko Epson Corporation, Tokyo, Japan

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/455,457

[22] Filed: May 31, 1995

Related U.S. Application Data

[63] Continuation of application No. 07/890,350, May 22, 1992, which is a continuation of application No. 07/496,788, Mar. 21, 1990, abandoned.

[30] Foreign Application Priority Data

Mar. 22, 1989 [JP] Japan .................................. 1-70256
Oct. 12, 1989 [JP] Japan .................................. 1-265679

[51] Int. Cl.⁶ ............................................. G09G 5/00
[52] U.S. Cl. ...................................... 345/173; 345/901
[58] Field of Search ................................. 345/156, 157, 345/173, 179, 169, 901, 902, 348, 349, 352, 354, 356, 357, 978; 364/705.06, 705.02, 705.03, 708.01; 434/178, 179, 307, 308, 322, 323

[56] References Cited

U.S. PATENT DOCUMENTS

| D. 277,962 | 3/1985 | Thom . |
| 4,159,417 | 6/1979 | Rubincam . |
| 4,545,023 | 10/1985 | Mizzi . |
| 4,633,323 | 12/1986 | Haberkern et al. . |
| 4,634,845 | 1/1987 | Hale et al. . |
| 4,639,225 | 1/1987 | Washizuka . |
| 4,664,299 | 5/1987 | Krenz . |
| 4,667,299 | 5/1987 | Dunn . |
| 4,779,080 | 3/1986 | Coughlin et al. . |
| 4,796,100 | 1/1989 | Sakaguchi . |
| 4,849,827 | 7/1989 | Hashimoto et al. . |
| 4,855,725 | 8/1989 | Fernandez ................................ 345/173 |
| 4,868,653 | 9/1989 | Golin et al. . |
| 4,868,764 | 9/1989 | Richards . |
| 4,873,764 | 10/1989 | Ishikawa et al. . |
| 5,031,119 | 7/1991 | Dulaney et al. .......................... 345/901 |
| 5,379,057 | 1/1995 | Clough et al. ............................ 345/173 |

FOREIGN PATENT DOCUMENTS

| 0149101 | 7/1985 | European Pat. Off. . |
| 0193996 | 9/1986 | European Pat. Off. . |
| 0252646 | 1/1988 | European Pat. Off. . |
| 0278051 | 8/1988 | European Pat. Off. . |
| 56 073985 | 6/1981 | Japan . |
| 62-0279585 | 3/1987 | Japan . |
| 62 080837 | 4/1987 | Japan . |
| 2-52588 | 11/1987 | Japan . |
| 63-157890 | 10/1988 | Japan . |

*Primary Examiner*—Chanh Nguyen

[57] ABSTRACT

A compact size, portable audio/display electronic apparatus having a compact mass memory with the capability of entry of user originated inquirable and inquisitorial input relative to currently displayed information and the random access capability relative to the compact mass memory in retrieving data responsive to such input. The apparatus includes a recording and reproducing device for recording and reproducing data in the form of alphanumeric information, diagram graphics, animation graphics, music, voice and other audio reproducible material. The reproducing device is employed only for the reproduction of the data, retrieving means for only retrieving the data for reproduction on a random access basis. Further, the display and reproducing device is arranged in one compact housing for the synchronized reproduction of at least two kinds of such data, e.g., the display of information and the audio reproduction of information directly associated with the displayed information.

3 Claims, 7 Drawing Sheets

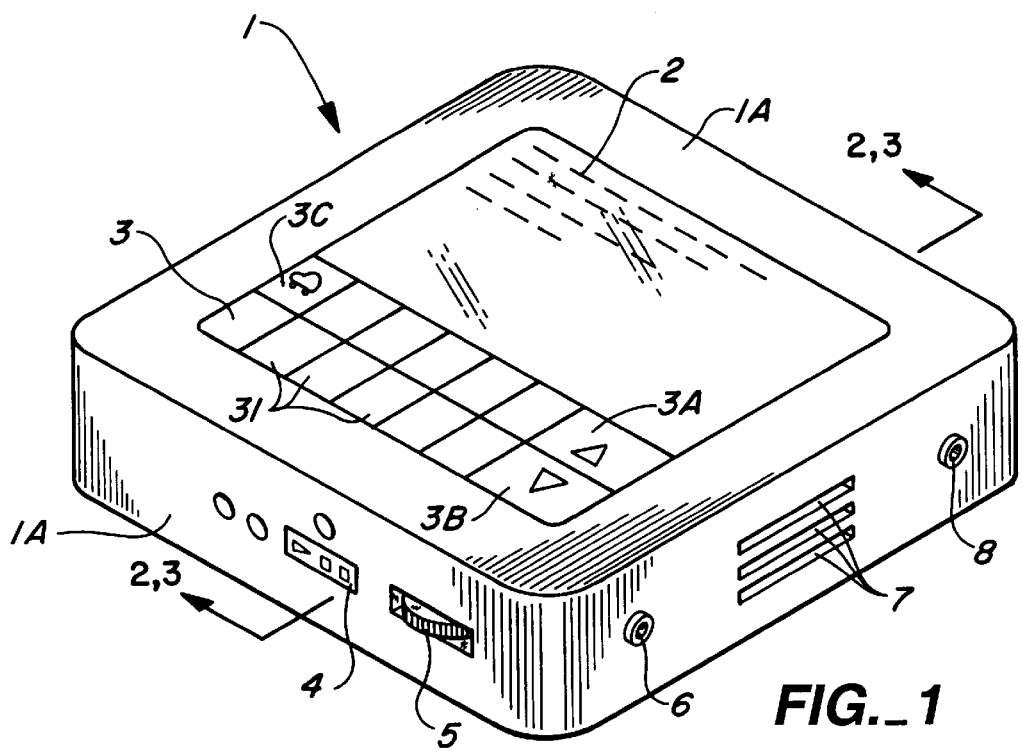
FIG._1
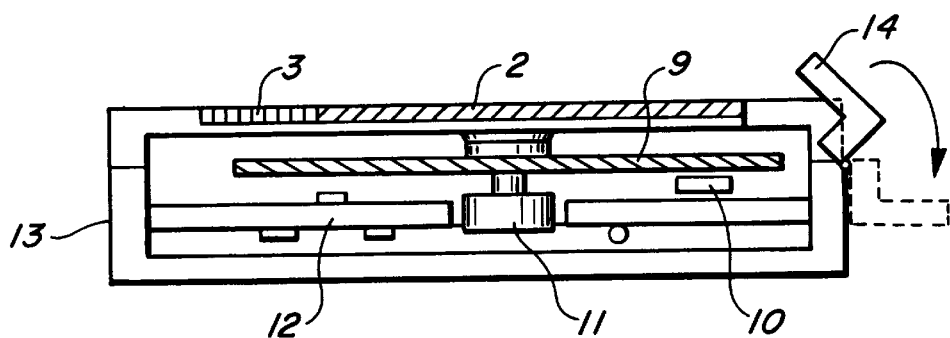
FIG._2
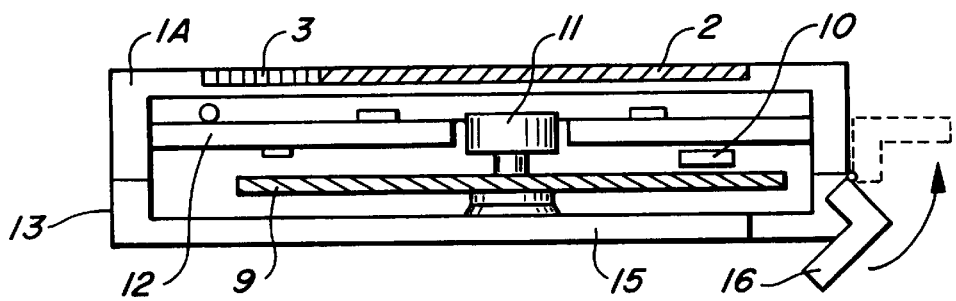
FIG._3

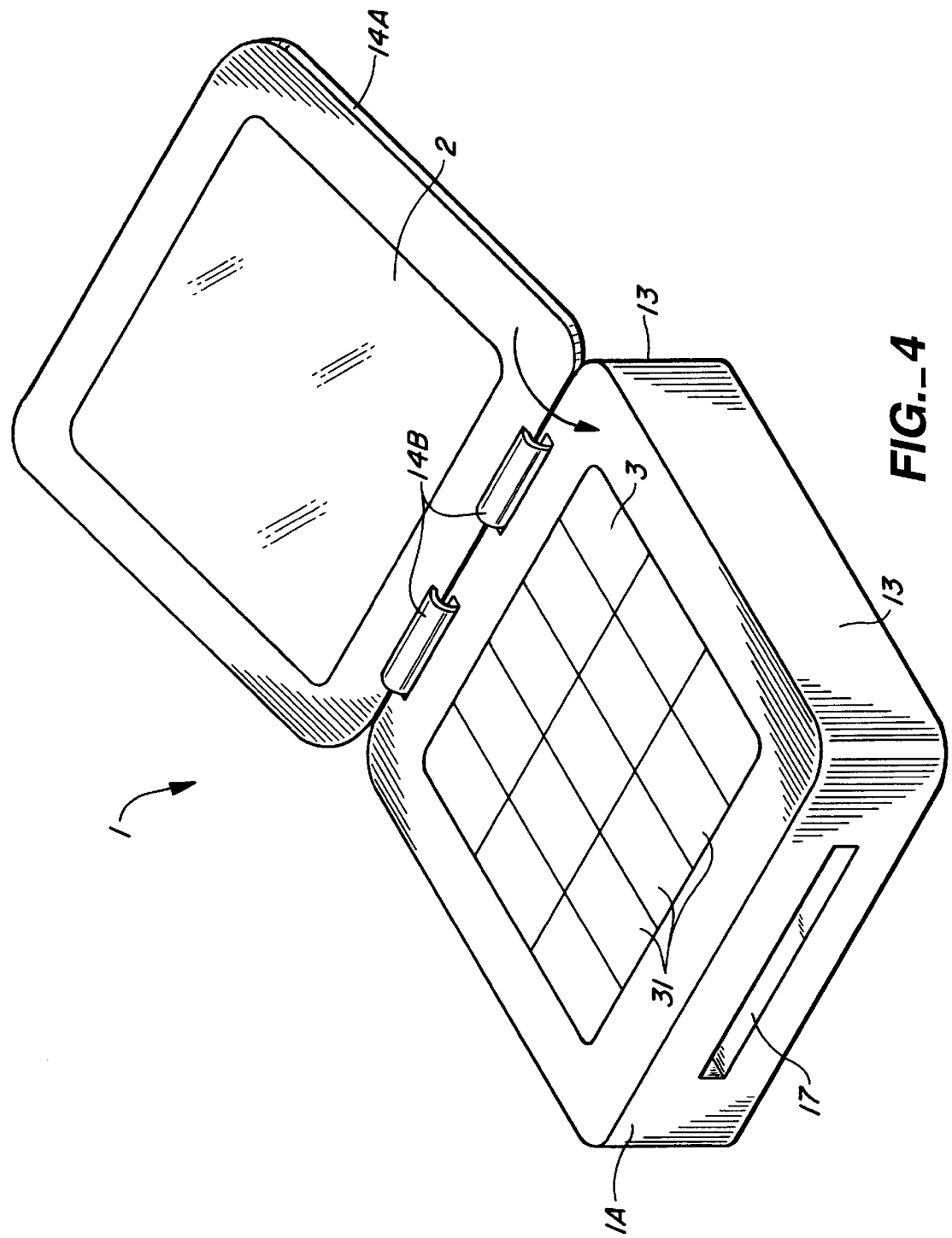
FIG._4

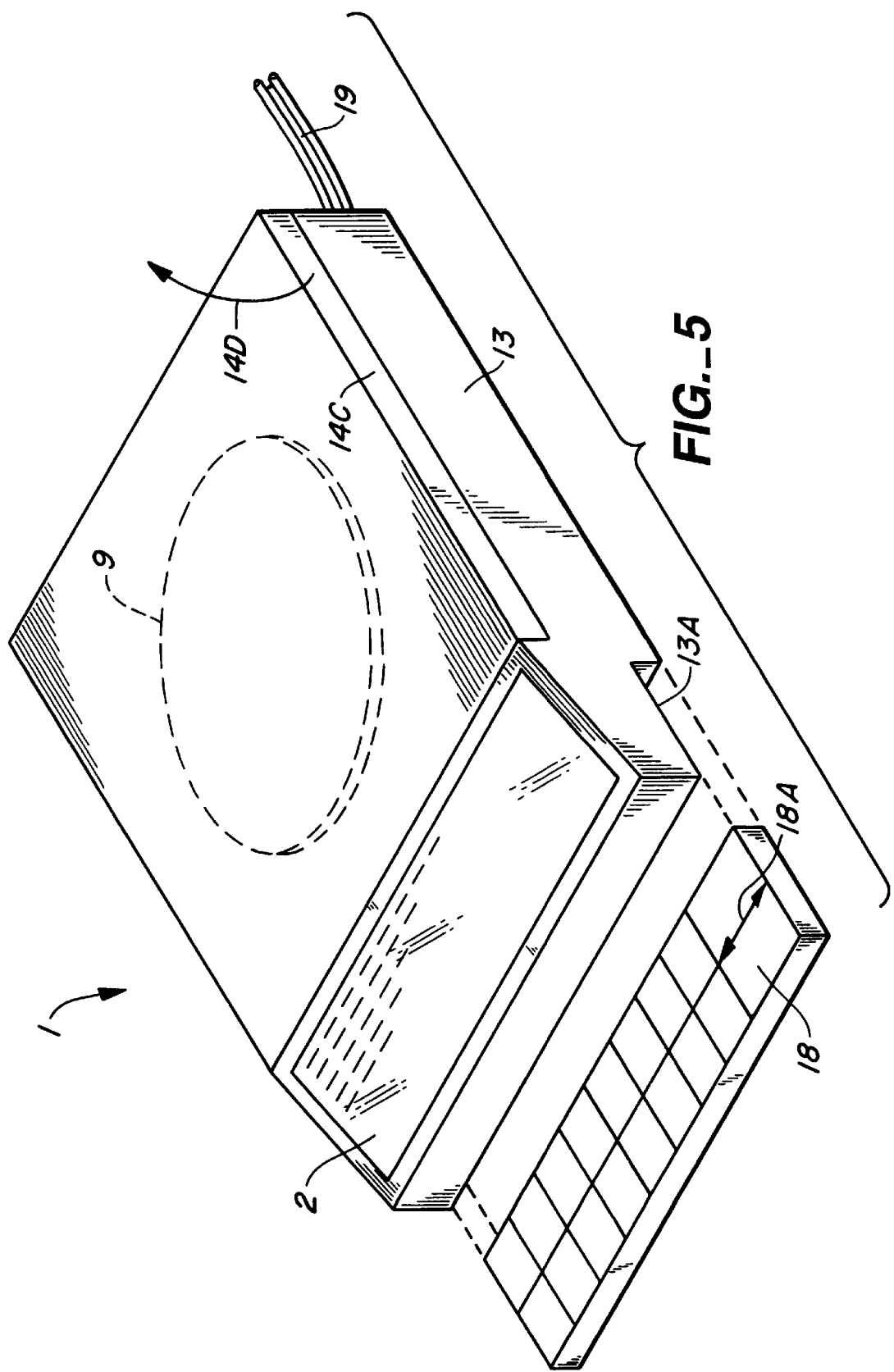

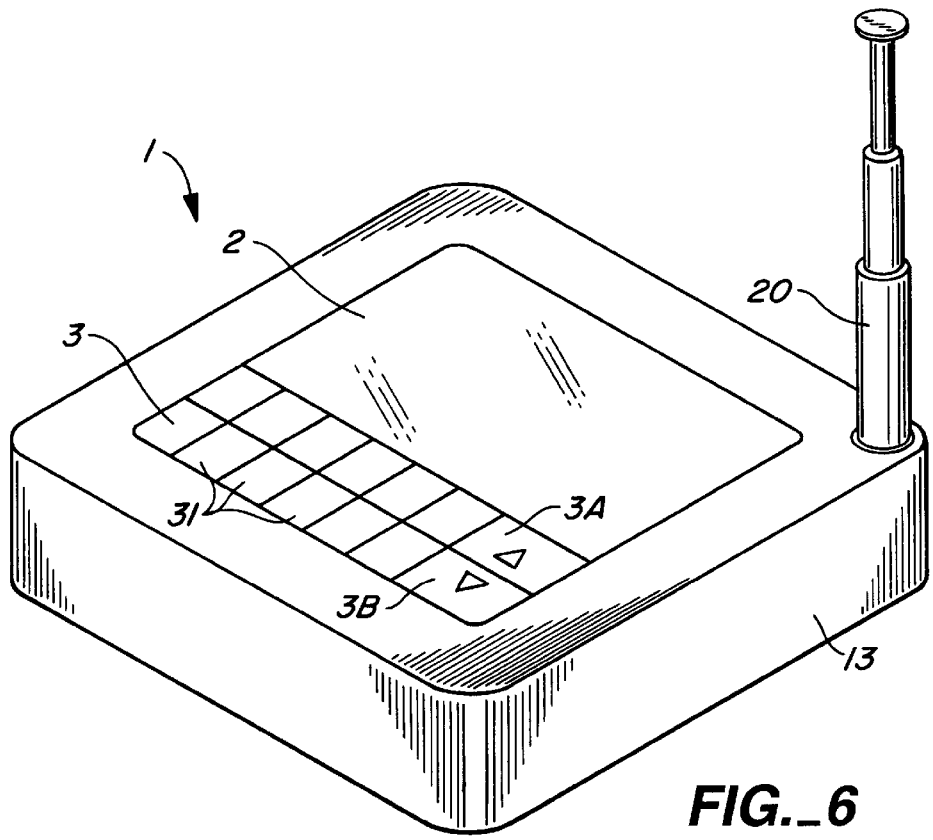
FIG._6
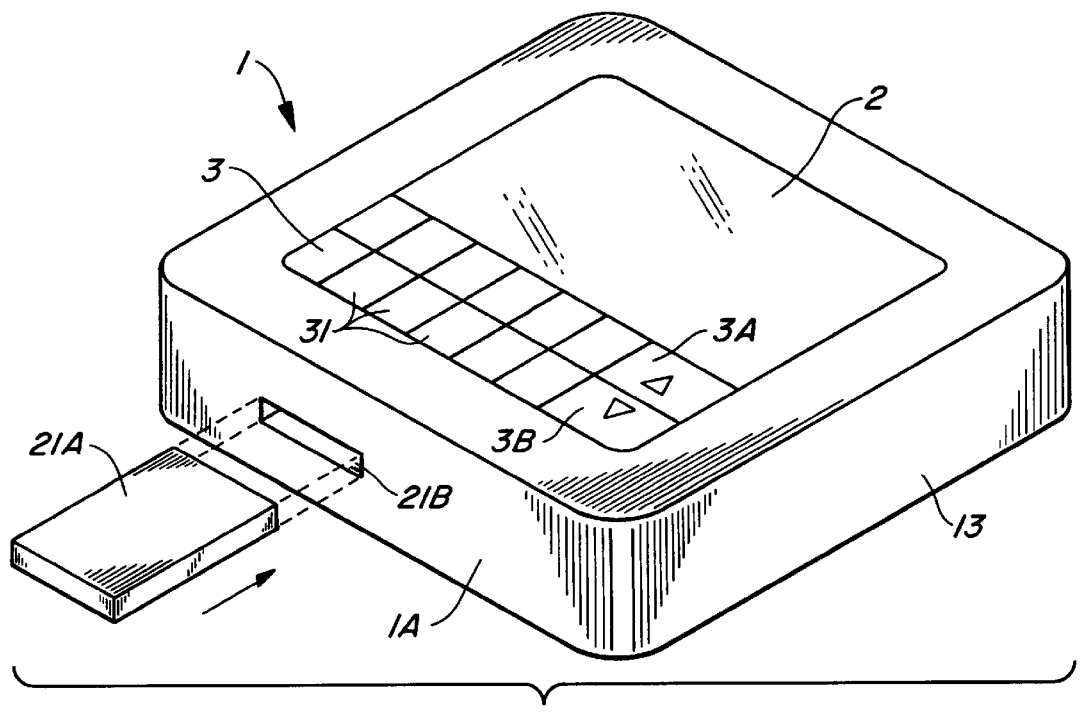
FIG._7

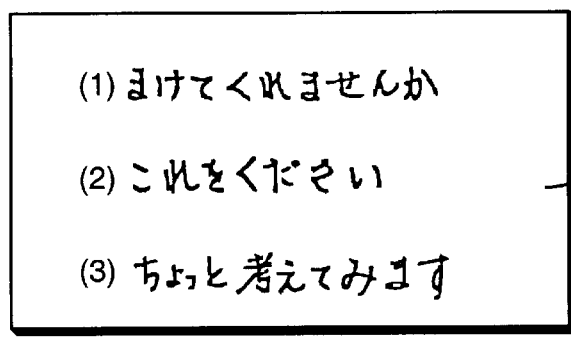
FIG._8A
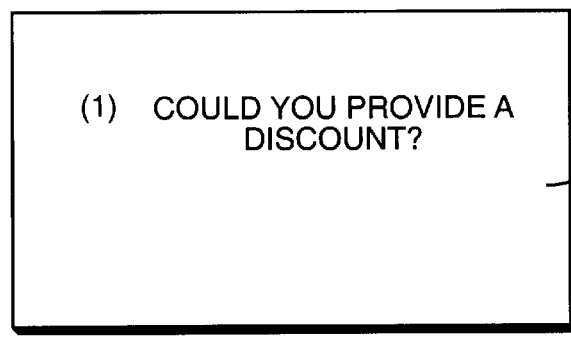
FIG._8B
FIG._9A
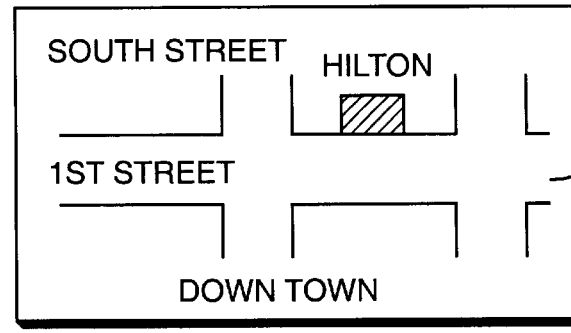
FIG._9B

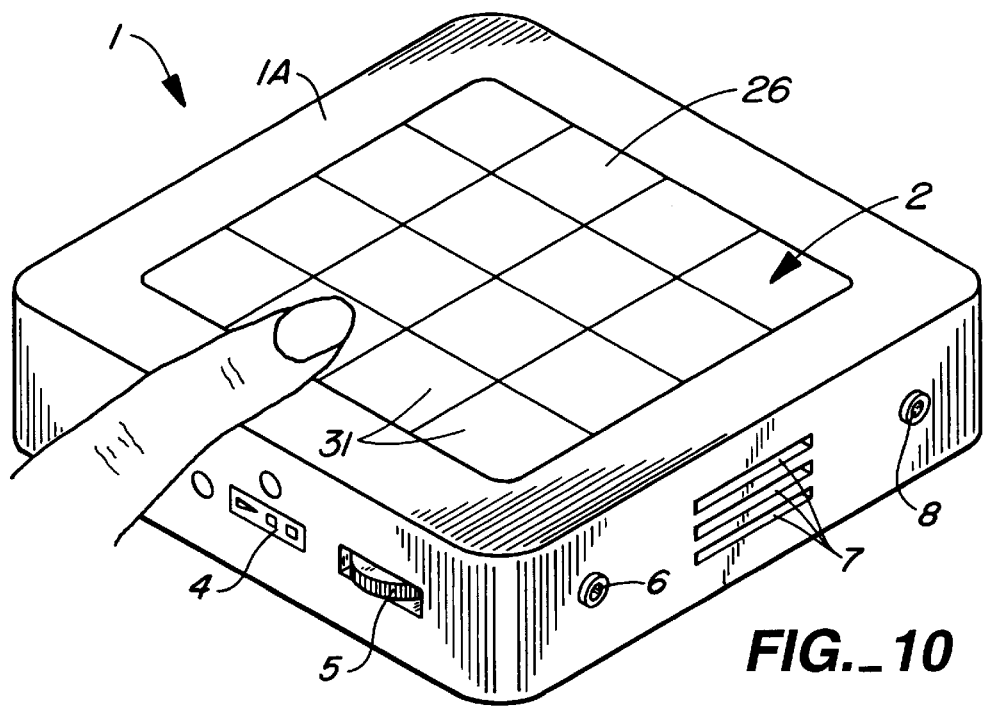
FIG._10
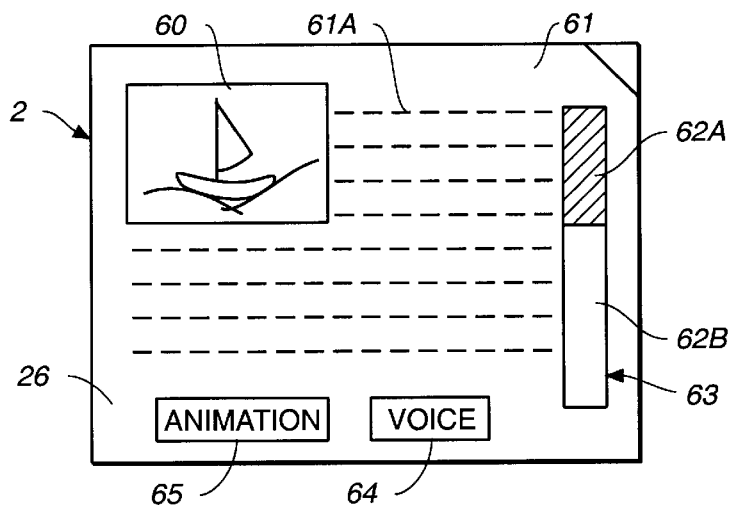
FIG._12
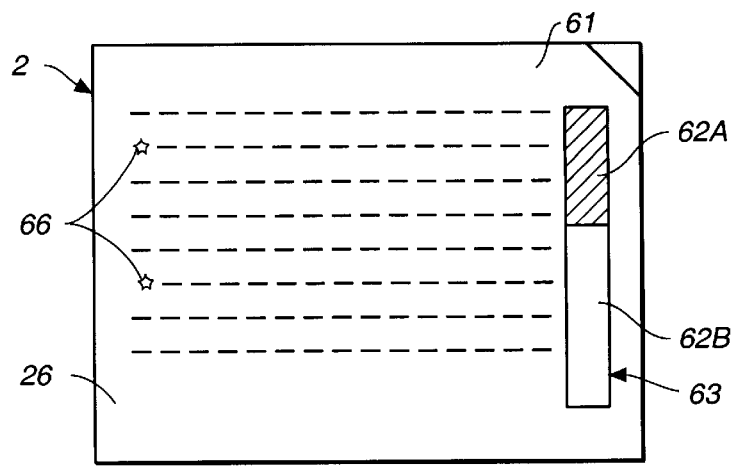
FIG._13

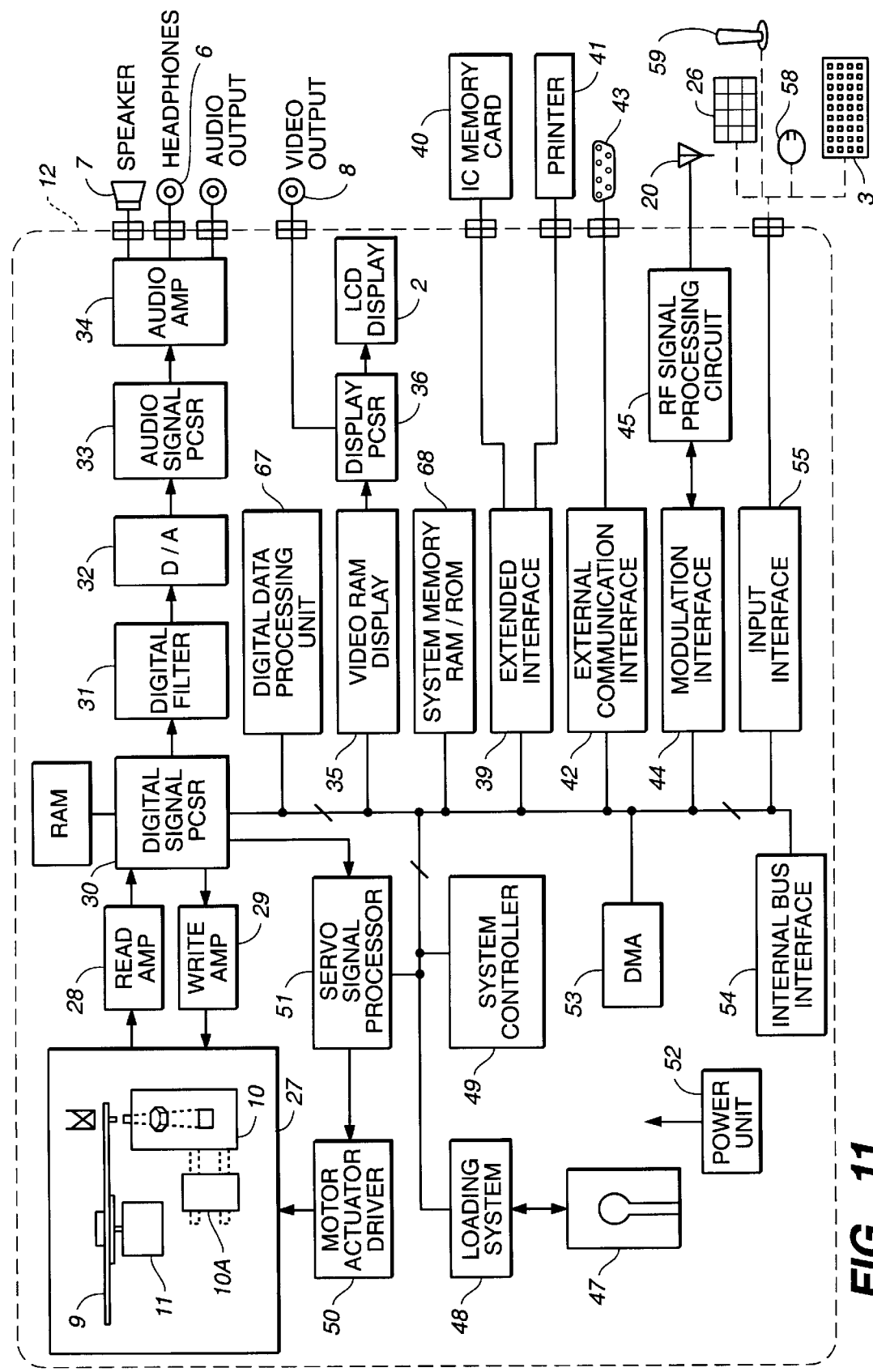
FIG._11

COMPACT PORTABLE AUDIO/DISPLAY ELECTRONIC APPARATUS WITH INTERACTIVE INQUIRABLE AND INQUISITORIAL INTERFACING

This is a continuation of U.S. patent application Ser. No. 07/890,350, filed May 22, 1992 which is a continuation of U.S. patent application Ser. No. 07/496,788 filed Mar. 21, 1990, now abandoned.

BACKGROUND OF THE INVENTION

This invention relates generally to a compact and portable audio/display device for displaying and reproducing data in form of alplanumeric information, diagrams, graphics, music, and sound which are recorded on a mass storage medium, such as, an optical medium, a magneto-optical recording medium, CD, CD-ROM or the like, wherein at least two kinds of data are randomly accessed for synchronized and uniform display and audio reproduction with the provision of a mass storage medium in a portable apparatus having an interactive user interface providing for inquirable and inquisitorial input by the user to random access and retrieve demanded response based upon information stored in such a memory. By "compact", it is meant that the apparatus is self contained, i.e., it contains all the functional components of the apparatus in a unitary handheld size unit. By "portable", it is meant that the apparatus can be comfortably held by the user in one hand and operated by the user with the other hand, contains its own power source and is easily carried from one place to another, for operation independent of any other kind of information source.

Compact and portable type personal data audio/display apparatus are now in common use, for example, compact electronic pocketbooks, notebooks or organizers which include various functional combinations, for example, one or more of the following functions: note pad, diary, phone directory, calendar, world clock, as well as compact electronic dictionaries and electronic translators. However, all of these types of compact and portable type personal data display apparatus are generally limited to alphanumeric and symbol data input/output. For example, a compact microcomputer notebook or pocket organizer is useful to collect dictated communications, such as, notes relative to an overseas trip and the user may visually read written words or sentences that appear on the organizer's display, but for such a small slim device there is no facility to orally reproduce the voice pronunciation of the words and sentences due to its compactness. To include concurrent audio reproduction capability and user inquirable and inquisitorial interfacing while retaining their compact size is considered not practical under present technology for such organizers.

Other compact and portable apparatus provide for concurrent audio speech/display output. One such application is disclosed in Japanese Laid Open publication No. 62-279585 published on Dec. 4, 1987. This publication discloses a portable CD and CD-ROM disc player apparatus which includes concurrent display of alphanumeric and symbol information with audio output, such as speech, associated with the displayed information. Both the audio output and visually displayed data is stored on the CD-ROM. Input means to the compact player apparatus provides interactive functions for stop, fast forward, fast return and start playback command modes. However, this type of interactiveness is of limited capability, i.e., there is no provision of providing a sufficiently large mass memory capability in combination with an input means that permits a user to actively interact with data concurrently displayed and audibly presented to the user, i.e., permitting inquirable and inquisitorial interfacing with data stored in and display on the apparatus for the purpose of invoking a response thereto, such as is common practice with, for example, non-handheld personal computers (PC), workstations, etc. This is primarily due to the need for compact mass storage memory and the necessary electronics required to provide random access to the mass storage memory to locate, retrieve, decode and display and audibly present data in response to user inquiries.

Another example of such a portable audio/visual electronic apparatus is disclosed in U.S. Pat. No. 4,639,225. The portable apparatus utilizes an insertable ROM memory card which contains both audio and video information. The memory card is inserted into the device for display of information on the apparatus display in conjunction with reproduction of speech and other audio information, for example, such as the display and audio reproduction of novels, cartoons and dictionary terms. However, the ability of a portable video/audio electronic apparatus of this type to provide good graphic display quality or generate speech and other audio reproduction via an IC memory card circuit is generally of bad quality. Furthermore, there is no means provided by which a user may actively interact with the data presented on the insertable memory, such as inquirable and inquisitorial interfacing by the user relative to current displayed data. Again, user interfacing in such compact and portable apparatus is aimed at a low level of controlling the presentation of the data, i.e., interfacing is limited to handling of the display and reproduction of audio information, such as start, stop, and sequential replay, either forward or reverse, of stored data, without the capability of entertaining inquiries by the user and providing information in the form of a response or answer to a presented inquiry.

Thus, the disadvantage of employing an IC memory or IC memory card is that the memory capacity for graphics and audio reproduction is too limited and the sound quality reproduction is not acceptable. Moreover, the same is true with the use of a tape memory for sound which is undesirable because random access is not efficiently possible and takes too long to retrieve and reproduce the selected sound portion. The use of a tape medium for recording takes a comparatively long period of time for random access of selected data or information desired for playback. Further, as previously indicated, a mass memory, such as a CD-ROM, may be easily employed as an external memory device for a PC, but these types of memories are inconvenient and expensive to consider for application apart from a personal computer application, such as for an application in a compact electronic organizer or other small portable electronic apparatus. An example of the foregoing is disclosed in U.S. Pat. No. 4,855,725 involving a portable electronic apparatus comprising an electronic simulated book that displays on a LCD panel a page of a book from a series of limited pages available in a limited memory provided in the portable apparatus. The apparatus provides for user input to display a selected page from a starting page to an ending page stored in the limited memory and also to consecutively display pages in ordered sequence set in memory. However, there is no ability to randomly select pages or input inquires into the apparatus based upon information displayed. Furthermore, since there is no mass storage capabilities in this portable apparatus, the user is required to be in close proximity for wireless communication to a PC which has peripheral mass storage of all the book pages on a CD-ROM. Thus, the limited supply of pages stored in the portable apparatus are replenished from the remote PC. As a result, there is no ability to employ the portable apparatus for long periods of time at a remote location from the PC so that any true portability of the apparatus is limited by its proximity to a nonportable PC unit. In this sense, the display apparatus is not truly portable.

Furthermore, there is no means in the portable apparatus of U.S. Pat. No. 4,855,725 for the user to actively interact with the apparatus at a level of entering queries into the apparatus pertaining to concurrently displayed information in order to solicit audio responses and/or responsive displayed illustrations to satisfy the entered query. Rather, as in the case of previously discussed Japanese Laid Open publication No. 62-279585, there is conventional input means for the purpose of stopping, starting, a sequencing information displayed and audibly reproduced without further higher level and more complex user interactiveness relative to the stored information. In this connection, while publication No. 62-279585 provides for a mass memory in the form of a CD or a CD-ROM, the function of the CD-ROM is to hold programs for their selective transfer to the memory of the apparatus for execution by the apparatus CPU without any capability of user inquirable and inquisitorial interactiveness relative to data stored on the CD-ROM.

Furthermore, it is difficult to input data to CD-ROM memories by means of an I/O device, such as, a compact keyboard. Thus, a compact portable apparatus that provides complement keyboard input for inputting information are small and not easily useable due to their limited size for the sake of compactness. Alternatively, a smaller key input means to function as a user interface could provide desired inquirable and inquisitorial interfacing with data stored in, displayed on and audibly reproduced by the apparatus.

It is an object of this invention to provide a solution to the foregoing mentioned problems.

It is another object of this invention to provide inquirable and inquisitorial interfacing in a compact portable audio/display electronic apparatus.

It is another object of this invention to provide a compact and portable audio/display electronic apparatus that provides for a large mass memory capability and for a high level of interactiveness between the user and stored data in the apparatus capable of providing concurrent visual and audio data in response to inquiries provided by a user relative to displayed data.

It is another object of the present invention to provide a compact display and reproducing apparatus which can immediately retrieve a substantial amount of data or information recorded on small optical media by randomly accessing such data or information and, further, synchronizes the reproduction of at least two kinds of such data, e.g., the display of information and the audio reproduction of information directly associated with the displayed information.

SUMMARY OF THE INVENTION

According to this invention, there is provided in a compact size, portable audio/display electronic apparatus having a compact mass memory with the capability of entry of user originated inquirable and inquisitorial input relative to currently displayed information and the random access capability relative to the compact mass memory in retrieving data responsive to such input. By "inquirable", it is meant the capability of permitting the user relative to a particular application to inquire into a subject matter provided in the compact mass memory or subject a subject recorded in the mass memory to inquiry. By "inquisitorial", it is meant the capability of permitting a user relative to a particular application to be inquisitory, to search and examine data or portions of audibly reproduced/displayed data and interact with the displayed data via iconic representations to obtain additional displayed or audibly reproduced data, e.g., graphic animation, providing additional explanation and enhancement concerning displayed data, e.g., text.

The compact electronic data display apparatus of this invention comprises recording and reproducing means for recording and reproducing data in the form of alphanumeric information, diagram graphics, animation graphics, music, voice and other audio reproducible material. The reproducing means is employed only for the reproduction of the data, retrieving means for only retrieving the data for reproduction on a random access basis. Further, the display and reproducing means is arranged in one compact housing for the synchronized reproduction of at least two kinds of such data, e.g., the display of information and the audio reproduction of information directly associated with the displayed information.

By arranging the data display and data reproducing means in one compact housing, it is possible with this invention to further miniaturize the entire apparatus. Further, the employment of an optical medium relative to this invention renders it possible to display a large amount of data in the form of alphanumerics, simple diagram and animation graphics and to reproduce audio data, such as sound, voice and music, being synchronized in presentation with the displayed data. The present invention provides a simple, compact and portable electronic apparatus for recording visual and audio data, randomly retrieving such data from the optical memory and synchronizing the displayed data with the audio reproduced data. Also, application software may be provided in the optical memory or in the form of an IC memory in combination with the optical memory to perform various functions on demand.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is an isometric view of an external configuration for the compact portable audio/display electronic apparatus of this invention including iconic input interfacing and associated display and audio output.

FIG. 2 is a cross sectional side elevation of FIG. 1 illustrating a first embodiment relative mass memory access.

FIG. 3 is a cross sectional side elevation of FIG. 1 illustrating a second embodiment relative mass memory access.

FIGS. 4, 5, 6, and 7 are respectively isometric views of four other external configurations for the compact portable audio/display electronic apparatus of this invention.

FIGS. 8A, 8B, 9A and 9B are examples of illustrating an application of the interactive interfacing provided by this invention relative to the synchronized displayed data and reproduced audio via random access of data stored relative to mass storage memory.

FIG. 10 is an isometric view of a further embodiment for the compact portable audio/display electronic apparatus of this invention including a combination display and overlying transparent input key panel.

FIG. 11 is a diagram of the control circuit employed relative to the several configurations of the compact portable audio/display electronic apparatus comprising this invention.

FIGS. 12 and 13 are examples illustrating an application of the interactive interfacing provided by this invention relative to an electronic book.

DESCRIPTION OF THE PREFERRED EMBODIMENTS

Reference is now made to FIG. 1 which illustrates an external view of one embodiment of a compact portable audio/display electronic apparatus 1 comprising this invention. Apparatus 1 includes casing 13 having display 2 on its top surface and an input keyboard 3 for operating display 2. Display 2 is preferably a liquid crystal display because of its low power requirement for the display of data. Any state-of-the-art liquid crystal display can be utilized, for example, a monochrome or multi-colored or full colored display.

On the front side surface 1A of casing 13 are operating buttons 4 for turning on apparatus 1 and for accessing the drive for a mass memory medium 9, such as, a CD, CD-ROM, or other such optical memory medium and a volume control 5 for controlling the volume of the audio output at speaker output 7. Side face 1B of casing 13 includes a headphone output terminal 6, speaker output 7 and CRT output terminal 8.

As shown in FIG. 2, cap portion 14 is rotatably mounted relative the top surface of casing 13 adjacent to LCD display 2. Cap portion 14 may be released by an operating button 4 and lifted to its open position to permit the insertion or removal of optical medium 9 from within the interior of casing 13, which medium is positioned on a spindle of spindle motor 11. Thus, cap portion 14 provides for easy insertion and removal of medium 9 relative to casing 13. In FIG. 3, another embodiment for insertion and removal of optical medium 9 is shown. In this case, cap portion 16 is rotatably mounted relative to the bottom side 15 of casing 13, i.e., on the side opposite to display 2. Cap portion 16 may be lifted to its open position to permit the insertion or removal of optical medium 9 from within the interior of casing 13 positioned on a spindle of spindle motor 11. Thus, cap portion 16 provides for easy insertion and removal of medium 9 relative to casing 13 while being positioned in a region on casing 13 separate from the region of display 2 so that the structure of display 2 is not stressed by pressure applied relative to the opening and closure of cap portion 16.

In FIGS. 2 and 3, schematically shown is a circuit board as supported in casing 13 from impact and shock and upon which is the IC circuit for control circuit system 12, illustrated in FIG. 11. System 12 controls the operation of medium 11 and the recording and retrieving of data relative to medium 11 via optical pickup 10 for display and audio reproduction.

In connection with both embodiments in FIGS. 2 and 3, the size of optical medium 9, e.g., a CD-ROM, is preferably small such as only 8 cm in diameter, which is sufficiently small in size for compact portable apparatus 1 so as to be easily carried in one's hand. However, it is also possible to use a larger standard size CD, e.g., 12 cm, in order to support a larger display 2 thereby rendering it possible to display not only alphanumerics but also to display larger area graphics, such as a large map or the like.

Input keyboard 3 may be a transparent touch panel or keyboard comprising individual keys 3' and also includes a card insertable card beneath the transparent top of keyboard 3 for making designated changes to the nomenclature or symbols employed in conjunction with the key caps of keyboard 3. Keyboard 3 need not be a full complement alphanumeric keyboard and may consist, for example, of several keys 3'. Fourteen such keys 3' are shown in FIG. 1. Two keys, 3A and 3B, are for scrolling to a previous display or to the next display of previously selected data relative to keys 3'. Keyboard 3 is employed to provide, for example, a two step interactively inquirable interfacing by the user by permitting the user to initially select a prerecorded subject group prerecorded on medium 9, display the subject group and thereafter select a particular item in that group for further treatment and display. Therefore, it is possible, for example, with keyboard 3, to first choose a subject group by selecting an appropriate symbol marked key 3' followed by selecting a particular item in the displayed subject group for further detailed display by selecting another symbol marked key 3'. Alternatively, a second level selection (i.e., an item selected from a retrieved subject group) may be a reassignment of function of the keys 3' on keyboard 3 to perform different tasks as compared to an assigned function of the same keys at the first level of selection (i.e., selection of the particular subject group).

FIG. 8 illustrates an example of inquirable interfacing via an application of compact portable audio/display electronic apparatus 1 employed as a pocket notebook employed, for example, in recording data or information relative to an overseas trip. In FIG. 8A, three Japanese sentences at 22 have been previously recorded on medium 9 concerning the trip and are prompted to be visually displayed as well audibly reproduced as speech via selection of a symbol or numerically identified key 3' on keyboard 3, such as a particular key or key combination indicative of the search location or functioning as a pointer in memory for the location of the subject group for purposes of retrieving and decoding of the selected digital data. One Japanese sentence, item or sentence (1), is then chosen by the user for retrieval relative to the subject group of sentences (1), (2), and (3) by selection of another symbol or numerically identified key 3' on keyboard 3. Then, the chosen sentence (1) is translated by apparatus 1 into English, as indicated in FIG. 8B, and thereafter the English translated sentence (1) is displayed on display 2 as indicated at 23 along with audibly reproduced data in the form of speech vocalizing the English sentence with good audio quality at speaker 7.

FIG. 9 is another example of an inquirable interfacing wherein a directory has been provided in apparatus 1 on medium 9 to include a list of hotels for a particular city, and this subject group may be selected via a particular key 3', such as, key 3C in FIG. 1, designated as a pointer memory for one of a particular subject groups. Then, the list of hotels, illustrated at 24 in FIG. 9A, is displayed on display 2. At this point, the function assignment of keys 3' are changed relative to the selection of an item from the displayed subject group. The user then selects a particular item, i.e., a hotel by selecting a numerically identified key 3' on keyboard 3 indicative of that selection, in this case, the hotel indicated as hotel (1) from the list 24. The graphic location of this hotel is thereafter displayed as a simple map 25 on display 2, which map is stored on medium 9 and is accompanied with reproduced audio explaining the location of the hotel, for example, on First Street relative to corresponding cross streets in the city. Thus, optical medium 9 provides for a compact medium for storing a comparatively large amount of data or information which can be displayed on apparatus display 2 accompanied with necessary translation or graphic diagrams concurrently reproduced with sound or music whereas conventional compact and portable apparatus of this kind provide only for the display of alphanumeric type data.

FIGS. 12 and 13 illustrate an example of inquisitional interfacing relative to apparatus 1 relative to an electronic book comprising a series of electronic pages recorded on medium 9. Here, individual pages of text of the book, such as a page 61A illustrated at 61 in FIG. 12, may be displayed on display 2 and for inquisitional embellishment of the text for enlightenment of the user is provided by employing a transparent coordinate touch panel 26 in FIG. 10 to provide a series of displayed icons, 63, 64 and 65, that are displayed with the displayed text 61A and appear to the user through the transparent touch panel 26. The activation of these displayed icons permits the user to receive additional relevant data related to currently displayed data, such as text 61A, to enhance the interest and inquisitiveness of the user as well as provide supplemental data to the user to function as a tutorial and enhance the knowledge and further understanding of the user with respect to the subject of the displayed text 61A. The icon bar indicator 63 shows the relationship of page 61 relative to entire electronic book of pages as represented by the length of bar 63 so that the user has a visual concept of the number pages in the entire book. The hatched portion 62A of indicator bar 63 is a visual indication of the number the pages that proceed the display of page 61 and portion 62B of indicator bar 63 is a visual indication of the number of pages that come after page 61. The display of page 61 includes one stationary graphic image 60 along with text 61A. Simple graphic animation of image 60 can be displayed by selecting displayed icon 65 to cause the stationary image 60 to move in animation such as through two or move motion frames, e.g., an animation of a sail boat moving over the waves on a body of water. Audio speech may accompany the display of page 61 by selecting voice icon 64. For example, reproduced audio speech may footnote or exemplify the displayed text. It is possible to accelerate the electronic advancement and display of pages by more than several pages at one time in conjunction with bar 63 by the user finger pressing on transparent coordinate positions along the length of iconic indicator bar 63 to cause selection and retrieval of a different book page either as a previous page within the confines of bar portion 62A or future page within the confines of bar portion 62B.

In FIG. 13, data is written into mass memory medium 9, such as, a magneto-optical memory of apparatus 1 and pointers 66 may be recorded in conjunction with recorded data, e.g., text 61A, that is considered particularly important in nature relative to a particular data section, for example. Pointers 66 are also retained in memory and corresponding encoded pointers to this data in memory is employed for retrieving at a later time and displayed for viewing, as is known in the art. Such marked data may also be printed via a connected printer as explained in connection with the embodiment of FIG. 5, discussed later. Another application of pointer marked data is to provide the function of selectively enlarging displayed alphanumeric information which enables users with poor eye sight to more easily read such information.

FIGS. 4 through 7 disclose other types of exterior configurations that may be employed relative to compact portable audio/display electronic apparatus 1. In FIG. 4, display 2 is formed as part of a cap portion 14A over casing 13 and cap portion 14A is rotatably attached at 14B to the upper portion of casing 13. Further, optical medium 9 is inserted in a slot 17 provided in the front side face 1A of casing 13.

In FIG. 5, display 2 is arranged on casing 13 separately from a cap portion 14C and cap portion 14C is rotatably attached to the upper portion of casing 13. Optical medium 9 is inserted into apparatus 1 by opening cap portion 14C, as indicated by arrow 14D, and placing medium 9 on the spindle support positioned beneath cap portion 14C. In this embodiment, input keyboard 18 is removably attached to the forward underside of casing 13 in a recess 13A. Keyboard 18 may be attached to the back side of recess 13A by first positioning keyboard 18 into recess 13A and then moving it laterally as indicated by arrow 18A to bring about its coupling to casing 13. Keyboard 18 may be connected as an input to system 12 by means of a cable (not shown) or by means of IR transceivers as is known in the art, e.g., illustrated in U.S. Pat. No. 4,855,725, previously discussed. Also, data stored on medium 9 in apparatus 1 and displayed on display 2 may also be printed out with a printer attached to connecting cable 19. Also, apparatus 1 may be employed as an external memory device for I/O connection to other office automation apparatus, e.g., personal computers, word processors or the like, by connecting such office apparatus to apparatus 1 via connecting cable 19.

FIG. 6 is an embodiment of apparatus 1 wherein it is possible to display visual data concurrently with audio data via receipt of a transmitted signal at antenna 20 to a transmitter/receiver in system 12 of apparatus 1. As an example, in a zoo, a user of apparatus 1 may approach a caged zoo animal and also come within the transmission range of a transmitted signal at the animal cage receivable at antenna 20. The received signal provides both displayed and graphic data relating to the particular animal as well as an audio explanation that accompanies the displayed data as well as other data pertaining to the particular animal.

FIG. 7 is an embodiment of apparatus 1 which enables recording and reproducing of data via the employment of a RAM IC memory card 21A insertable into slot 21B in front face 1A as well as an optical medium 9, such as CD-ROM, insertable into apparatus 1 in the manner explained previously in connection with the embodiments of FIGS. 2 and 3. Also, it is possible to record new data on optical medium 9, employing either an erasable type magneto-optic medium or a write once type medium, supplied from an external database via, for example, a modem.

FIG. 10 shows another embodiment of the electronic apparatus wherein LCD display 2 comprises an overlying, transparent touch key panel 26. When a portion of the coordinate detection surface representing keys 3' is depressed, as indicated in FIG. 10, the coordinate value of that portion is detected and is representative of the particularly selected key 3'.

FIG. 11 is a circuit diagram of the control circuit system 12 employed with respect to the embodiments of apparatus 1 shown in FIGS. 1, 4, 5, 6, 7 and 10 and relative to the previously explained interactive inquirable and inquisitional interfacing discussed in connection with FIGS. 8, 9, 12 and 13.

In FIG. 11, compact mass storage record and playback unit 27 is connected in system 12 to digital signal processor 30 through READ amplifier 28 and WRITE amplifier 29 and motor/actuator driver 50 is connected to optical pickup actuator 10A and spindle motor 11 in unit 27. The heart of circuit system 12 is system controller 49 followed by digital signal processor 30. System controller 49 contains the CPU and controller functions for executing instructions from system memory 68, which includes both RAM and ROM memory. Functional operation of controller 49 is well known in the art, and processing input signals in accordance with a program stored in the ROM to control other processing circuits to be noted later and controlling the access, time sharing and synchronization of other circuit and I/O components connected in system 12 to data bus 70. For the purpose of simplification, address buses and addressing functions necessary to the operation of system controller 49 and addressed components connected to bus 70 are not shown but are well known in the art. Internal bus interface 54 controls access of connected components to bus 70 under the control of system controller 49. DMA provides for direct peripheral to memory communication and control as is known in the art.

Connected to bus 70 is servo processor 51 which is connected to servo driver 50 for controlling the movement and operation of spindle motor 11 and pickup actuator 10A. Also, digital signal processor 30 is connected to bus 70 and to servo signal processor 51 for the purpose of accessing recorded data or recording data on medium 9 under the control of system controller 49.

The function of digital signal processor unit 30 is interleaving processing and to code data to be recorded on medium 9 via WRITE amplifier 29 and decode data retrieved from medium 9 via READ amplifier 28. READ amplifier is all that is required relative to the employment of mass memory medium 9 as a CD-ROM. Video data compression is known in the art and is exemplified in U.S. Pat. Nos. 4,868,764 and 4,868,653. Digital signal processor 30 retrieves audio data, such as, voice or music, as well as display data and separates the data as coded and decodes, demodulates and decompresses the separated data. Audio data pass through digital filter 31, D/A converter 32, audio signal processing unit 33 and audio amplifier 34 for output, such as speaker output 7, or to a headphone set, via output terminal 6 or to other remote audio output.

Decompressed display data, such as alphanumeric or animation graphic data is provided on bus 70 to display processor 36 via display memory 35 for processing and display of the image data on LCD display 2. The display data may also be provided at video output for supply to an external TV.

The function of apparatus 1 can be expanded by the provision of additional memory employing a RAM IC card 40 (21A FIG. 7) to include a software program or data for operation relative to system controller 49. Such programs are transferred via extended interface 39 to RAM system memory 68 wherein the program can be executed under the control of system controller 49. Also, the content on display 2 can be provided for printout to printer 41 via extended interface 39.

Data may be received or transmitted through a modem from an external data source employing external communication interface 42 and communication cable connector 43. Circuits 44 and 45 are relevant to the configuration shown in FIG. 6 wherein data is transmitted to antenna 20 and processed by high frequency processing circuit 45 for storage on medium 9 via digital signal processor 30 or for display via display processor 36 and audio output via processor 30. As an example, medium 9 may contain a portion of a map for display on LCD display 2 while a signal received at antenna 20 may be superimposed on display 2 to pinpoint a particular location on the displayed map. By the same token, data on medium 9 may be read and decoded via digital signal processor 30 for transmission wherein the prepared data signal on bus 70 is modulated at circuit 44 and is transmitted from antenna 20 by high frequency signal processing circuit 45. As an example, such a transmitted signal can indicate a particular location of apparatus 1 relative to a remote transceiver.

User interactive input to system 12 is by one or more input devices, such as touch panel 26 (FIG. 10) or keyboard 3 or 18 (FIGS. 1–7), or mouse 58 or joy stick 59, wherein data entry is read by. system controller 49 in communication with input interface via bus 70.

System 12 may also include, for certain additional program applications, a loading system 48 connected to system controller 49 and to disc loading unit 47 for operation and control of a microdisc, e.g., a small sized CD or CD-ROM, inserted into unit 47.

Digital data processing unit 67 is connected to bus 70 for ECC or interleaving processing.

Lastly, power unit 52 provides for power connection to a DC power source such as a standard or rechargeable battery or an automobile battery via a DC/DC adaptor or to an external AC source via an AC adapter.

As indicated above, various different applications may be employed relative to the compact portable audio/display electronics apparatus 1 of this invention as all exemplified in FIG. 11 but provided in different possible combinations as indicated relative to the different configurations of FIGS. 1–7 and 10. Also, by providing a permanently installed read/write optical medium 9 in unit 27 wherein data can be provided to the memory from an external source, such as input devices 3, 26, 58 and 59 or from input via IC card 40 or via antenna 46. Lastly, the configuration of apparatus 1 can be constructed to be thin in size thereby reducing its cost and improving its structural resistance against shock and vibration.

While the invention has been described in conjunction with several specific embodiments, it is evident to those skilled in the art that many further alternatives, modifications and variations will be apparent in light of the forgoing description. Thus, the invention described herein is intended to embrace at such alternatives, modifications, applications and variations as fall within the spirit and scope of the appended claims.

What is claimed is:

1. An interactive, audio-visual electronic apparatus comprising:

a compact portable casing held in one hand by a user and interactively operated with the other hand of a user, a liquid crystal display supported on a surface of said casing having a viewing surface for display of groups of matrix arranged visually displayed elements as well as pictorial display of information, digital processing means in said casing for writing and reading audio-visual data to and from a memory in response to user invoked input via a touch key input for pictorial display of said information concurrently with reproduced audio, said touch key input comprising a transparent matrix formed over said viewing surface of said liquid crystal display, said matrix comprising a plurality of matrix arranged transparent touch keys in corresponding alignment with said matrix arranged visually displayed elements of said liquid crystal display, each of said touch keys functionally operating as a first set of input keys to said digital processing means in conjunction with a first set of said matrix arranged visually displayed elements and each of said touch keys functionally operating as a second, different set of input keys to said digital processing means in conjunction with a second, different set of said matrix arranged visually displayed elements after selection of at least one of said touch keys functionally operating as said first set of input keys, a compact mass memory contained within said casing comprising an optic storage medium for recording, storage and retrieval of audio/display digital data comprising a plurality of first data groups having a plurality of second data groups each of which is related to at least one of the first data groups, said second data groups comprising audio/visual data representations in response to an inquirable or inquisitorial query by a user through said transparent touch key input matrix relating to the plurality of first data groups, said inquirable query permitting a user relative to a particular application to inquire into a subject matter provided in said compact mass memory, said inquisitorial query permitting a user to search and examine data and interact with the displayed data via iconic representations to obtain additional displayed or audibly reproduced data, said first set of said matrix arranged visually displayed elements being provided for selecting one of said plurality of first data groups via said digital processing means and said second set of said matrix arranged visually displayed elements being provided for selecting one of said plurality of second data groups via said digital processing means relating to the plurality of first data groups;

whereby when said touch keys are functionally operating as said second set of input keys, the second set of input keys operate in conjunction with said second set of matrix arranged visually displayed elements for allowing a user to select one of a plurality of said second data groups which comprise audio-visual representations.

2. An interactive, audio-visual electronic apparatus comprising:

a unitary, handheld casing having at least one substantially planar surface, internally housed, removable optical storage means for storing a plurality of data groups in a random access format, each of said data groups comprising interrelated text, animation, audio and keymenu data, a keypad for capturing user input, said keypad including a plurality of multifunctional, data specific keys programmable according to said keymenu data, visual display means disposed on said enclosure surface for displaying at least one screen of text and animation data of a first selected data group retrieved from said optical storage means, internally housed audio reproduction means for audibly reproducing audio data of said first selected data group synchronized to said at least one displayed screen of said first selected data group, and an internally housed central system controller electronically coupled to said keypad, optical storage, visual display, and audio reproduction means for programming said data specific keys of said keypad in response to user input of a selection from said keymenu data of said first selected data group, retrieving a second selected data group, including interrelated text, animation, audio and keymenu data, in response to user input selection, and outputting said second selected data group data to said keypad, visual display and audio reproduction means, wherein each of said plurality of data specific keys are on a touch sensitive matrix arranged transparent key pad and functionally operate as a first set of input keys in conjunction with said first selected data group and each of said plurality of data specific keys functionally operate as a second set of input keys in conjunction with said second selected data group.

3. A portable multimedia device, comprising:

a handheld casing housing an information processor and a mass storage unit in communication with said information processor, said mass storage unit including a medium storing multimedia data contextually arranged in a hierarchy defining a plurality of subject groups, the multimedia data comprising at least one of visual and audio data;

a display disposed on said casing and communicating with said information processor for displaying visual information to a user, the visual information including a plurality of interfacing icons;

an audio reproduction unit communicating with said information processor for reproducing audio information to the user; and a transparent touch panel disposed on said display, said touch panel defining touch keys aligned with the interfacing icons, user activation of at least one of the touch keys causing said information processor to select one of the subject groups of the multimedia data hierarchy; and subsequent user activation of at least one of the touch keys permits a user to inquirably and inquisitorily access multimedia data stored on the medium of said mass storage unit based on the selected one of the subject groups of the multimedia hierarchy and at least one of the visual information being displayed on said display and the audio information being reproduced by said audio reproduction unit, said inquirable query permitting a user relative to a particular application to inquire into a subject matter provided in said compact mass memory, said inquisitorial query permitting a user to search and examine data and interact with the displayed data via iconic representations to obtain additional displayed or audibly reproduced data.

* * * * *

UNITED STATES PATENT AND TRADEMARK OFFICE
CERTIFICATE OF CORRECTION

PATENT NO.     :  5,914,707
DATED          :  June 22, 1999
INVENTOR(S)    :  Mitsuru Kono It is certified that errors appear in the above identified patent and that said Letters Patent is hereby corrected as shown below:

Title page, item 56, References Cited, U.S. Patent Documents, change "4,664,299" to --4,664,053--.

Title page, item 56, References Cited, U.S. Patent Documents, change "4,873,764" to --4,873,586--.

Signed and Sealed this

Thirtieth Day of November, 1999

Attest:

Q. TODD DICKINSON

*Attesting Officer*   *Acting Commissioner of Patents and Trademarks*